United States Patent
Yang et al.

(10) Patent No.: US 10,189,094 B2
(45) Date of Patent: Jan. 29, 2019

(54) MULTIFUNCTIONAL ADJUSTABLE DRILLING MACHINE

(71) Applicant: CITIC Dicastal CO.,LTD., Qinhuangdao, Hebei (CN)

(72) Inventors: Jinling Yang, Qinhuangdao (CN); Li Yang, Qinhuangdao (CN); Naizheng Hu, Qinhuangdao (CN); Jiansheng Wang, Qinhuangdao (CN)

(73) Assignee: CITIC DICASTAL CO., LTD., Qinhuangdao, Hebei (CN)

( * ) Notice: Subject to any disclaimer, the term of this patent is extended or adjusted under 35 U.S.C. 154(b) by 0 days.

(21) Appl. No.: 15/688,905

(22) Filed: Aug. 29, 2017

(65) Prior Publication Data

US 2018/0354043 A1 Dec. 13, 2018

(30) Foreign Application Priority Data

Jun. 13, 2017 (CN) .......................... 2017 1 0443671

(51) Int. Cl.
| | |
|---|---|
| *B23B 39/16* | (2006.01) |
| *B23B 49/02* | (2006.01) |
| *B23Q 3/06* | (2006.01) |
| *B23B 47/00* | (2006.01) |

(52) U.S. Cl.
CPC .............. *B23B 39/16* (2013.01); *B23B 49/02* (2013.01); *B23Q 3/06* (2013.01); *B23B 47/00* (2013.01)

(58) Field of Classification Search
CPC ......... B23B 39/02; B23B 39/12; B23B 39/16; B23B 41/02; Y10T 408/3788
See application file for complete search history.

(56) References Cited

U.S. PATENT DOCUMENTS

| | | | | |
|---|---|---|---|---|
| 3,687,563 | A * | 8/1972 | McConnell | B23B 39/16 408/236 |
| 4,162,134 | A * | 7/1979 | Kitagawa | B23B 39/16 408/42 |
| RE32,211 | E * | 7/1986 | Jerue | B23B 29/03446 82/1.11 |
| 6,343,899 | B1 * | 2/2002 | Straub | B23B 29/03482 408/150 |
| 2004/0179908 | A1 * | 9/2004 | Bando | B23B 35/005 408/1 R |

(Continued)

*Primary Examiner* — Nicole N Ramos
(74) *Attorney, Agent, or Firm* — Cooper Legal Group, LLC

(57) ABSTRACT

Disclosed is a multifunctional adjustable drilling machine. Supporting leg seats are connected with a frame, the frame is connected with a bottom plate, the bottom plate is connected with driller supports, the bottom plate is provided with holes and positioning pins matched with the driller supports, the angles of driller support index plates can be adjusted, drillers machine holes in an automobile die casting at different angles, and a compression cylinder bracket and a compression cylinder support are connected to the bottom plate. A compression plate is connected to a piston rod of a compression cylinder, the compression cylinder is arranged on the compression cylinder support, and motors drive belt pulleys and conveying belts to rotate so as to drive main shafts of the drillers to rotate. The automobile die casting is positioned by a clamp body, and the compression plate clamps the automobile die casting via the compression cylinder.

1 Claim, 2 Drawing Sheets

(56) References Cited

U.S. PATENT DOCUMENTS

| | | | |
|---|---|---|---|
| 2007/0221337 A1* | 9/2007 | Sammartin | B23Q 3/062 157/14 |
| 2009/0022558 A1* | 1/2009 | Bando | B23B 35/00 408/1 R |
| 2009/0067940 A1* | 3/2009 | Arai | B24B 9/14 408/22 |
| 2014/0356086 A1* | 12/2014 | Hirko | B23B 39/167 408/1 R |

* cited by examiner

MULTIFUNCTIONAL ADJUSTABLE DRILLING MACHINE

CROSS-REFERENCE TO RELATED APPLICATIONS

This application is filed based upon and claims priority to Chinese Patent Application No. 201710443671.9, filed on Jun. 13, 2017, the entire contents of which are incorporated herein by reference.

TECHNICAL FIELD

The present disclosure relates to a drilling machine, and specifically, to a multifunctional adjustable drilling machine.

BACKGROUND

Automobile die castings are machined with holes by numerical control machining. However, the numerical control machining cost is high, so a time-saving and labor-saving adjustable drilling machine is urgently needed.

SUMMARY

The present disclosure provides a time-saving and labor-saving multifunctional adjustable drilling machine.

The multifunctional adjustable drilling machine includes supporting leg seats, a frame, a bottom plate, driller supports, driller support index plates, drillers, a compression cylinder bracket, a compression cylinder support, a compression plate, a compression cylinder, motors, belt pulleys, conveying belts, a clamp body and a drill bit guide sleeve assembly.

The supporting leg seats are connected with the frame, the frame is connected with the bottom plate, the bottom plate is connected with the driller supports, and the bottom plate is provided with holes and positioning pins matched with the driller supports, so that the driller supports are adjusted to different installation positions. The angles of the driller support index plates can be adjusted, the drillers machine holes in an automobile die casting at different angles, and the compression cylinder bracket and the compression cylinder support are connected to the bottom plate. The compression plate is connected to a piston rod of the compression cylinder, the compression cylinder is arranged on the compression cylinder support, and the motors drive the belt pulleys and the conveying belts to rotate so as to drive main shafts of the drillers to rotate. The automobile die casting is positioned by the clamp body, and the compression plate clamps the automobile die casting via the compression cylinder. The drill bit guide sleeve assembly exerts the effect of preventing the drillers from deviating.

The multifunctional adjustable drilling machine has the characteristics that multiple holes can be simultaneously horizontally machined and the automobile die casting can be machined with holes at different angles by adjusting the angles of the index plates below the drillers.

Figure 1:
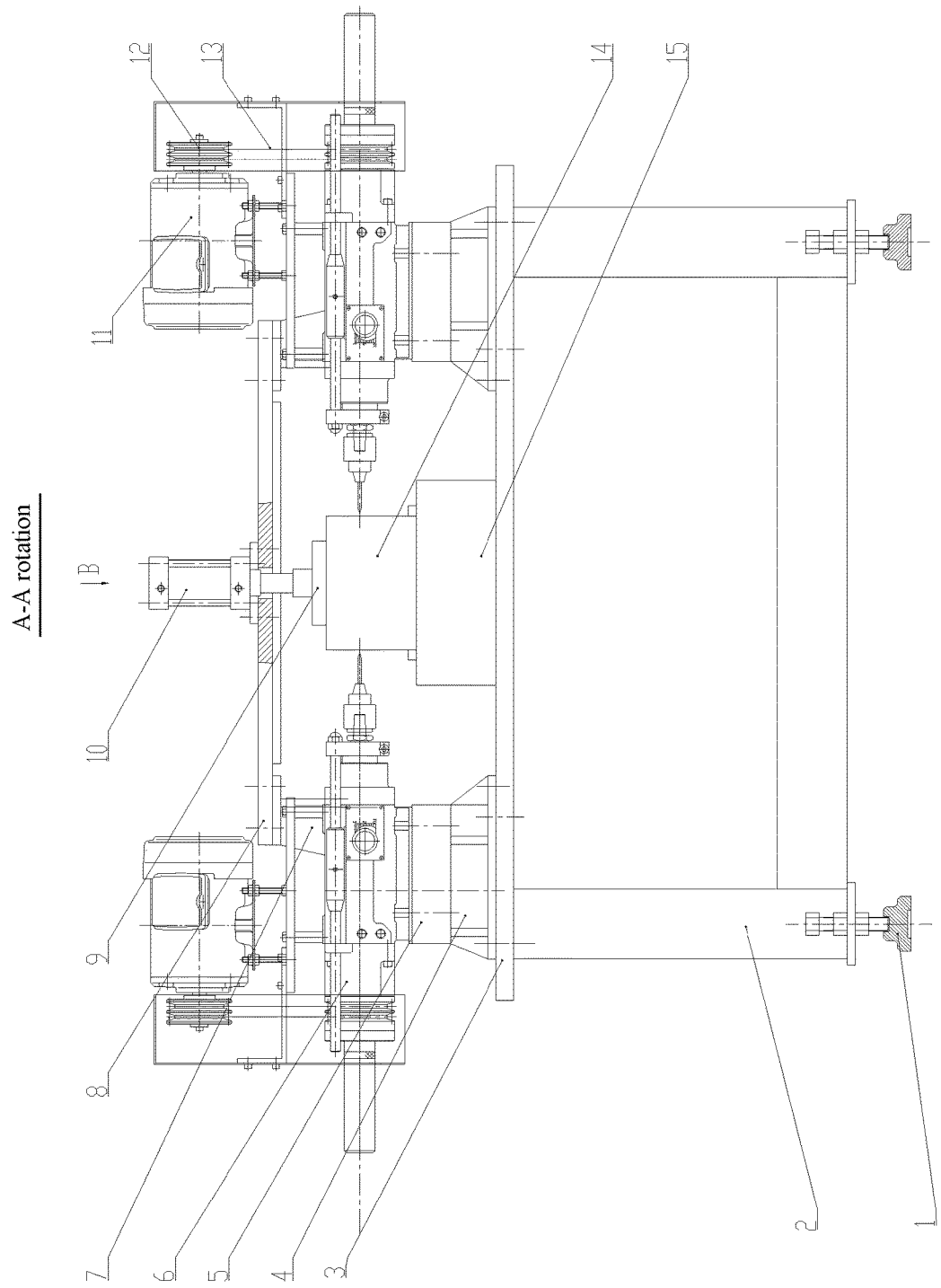
FIG. 1 is a schematic front view of a multifunctional adjustable drilling machine.
Figure 2:
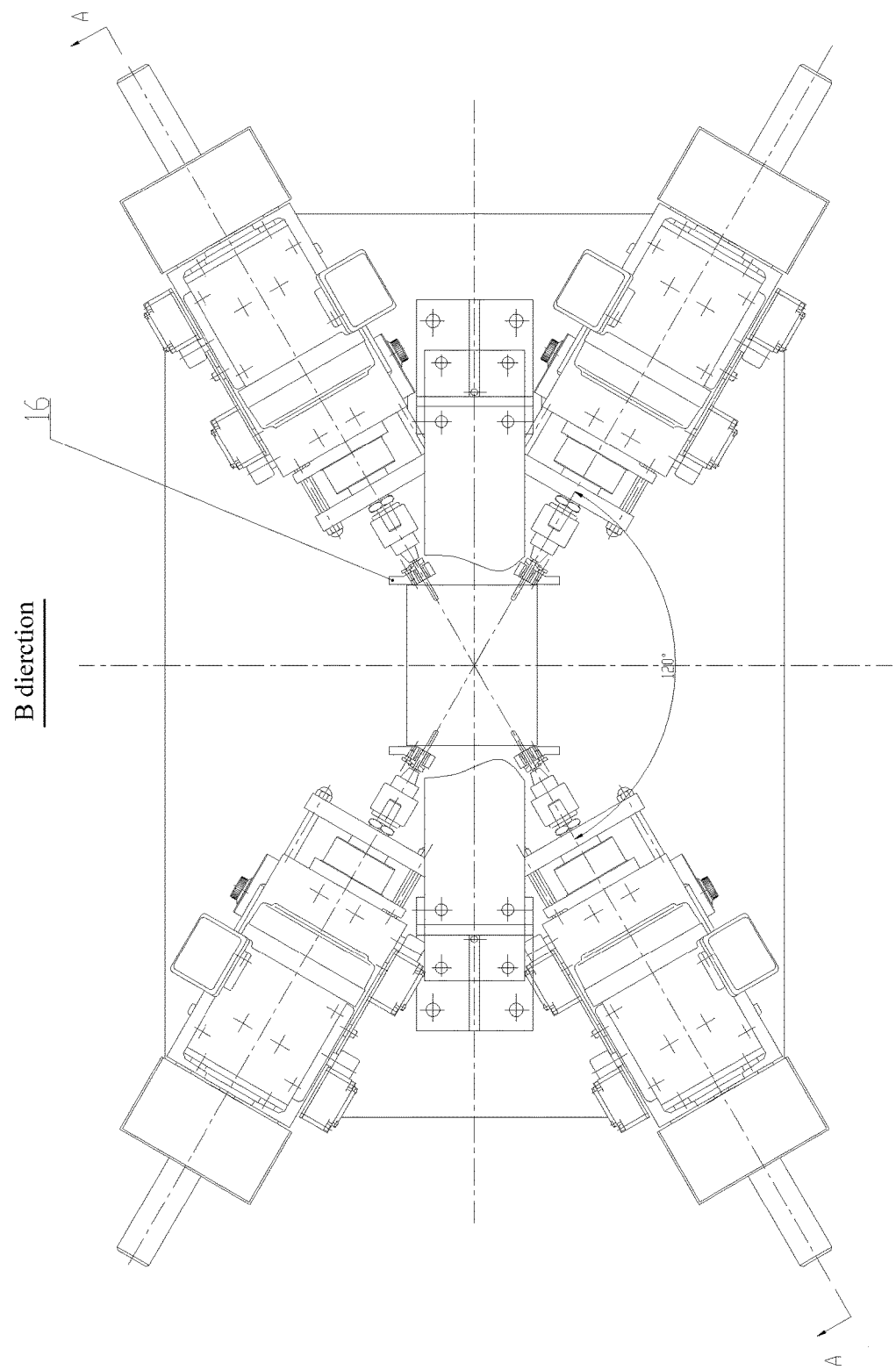
FIG. 2 is a schematic top view of the multifunctional adjustable drilling machine.

LIST OF REFERENCE NUMERALS 1 supporting leg seat
2 frame
3 bottom plate
4 driller support
5 driller support index plate
6 driller
7 compression cylinder bracket
8 compression cylinder support
9 compression plate
10 compression cylinder
11 motor
12 belt pulley
13 conveying belt
14 automobile die casting
15 clamp body
16 drill bit guide sleeve assembly

DETAILED DESCRIPTION

A multifunctional adjustable drilling machine includes supporting leg seats 1, a frame 2, a bottom plate 3, driller supports 4, driller support index plates 5, drillers 6, a compression cylinder bracket 7, a compression cylinder support 8, a compression plate 9, a compression cylinder 10, motors 11, belt pulleys 12, conveying belts 13, a clamp body 15 and a drill bit guide sleeve assembly 16.

The supporting leg seats 1 are connected with the frame 2, the frame 2 is connected with the bottom plate 3, the bottom plate 3 is connected with the driller supports 4, and the bottom plate 3 is provided with holes and positioning pins matched with the driller supports 4, so that the driller supports 4 are adjusted to different installation positions. The angles of the driller support index plates 5 can be adjusted, the drillers 6 machine holes in an automobile die casting at different angles, and the compression cylinder bracket 7 and the compression cylinder support 8 are connected to the bottom plate 3. The compression plate 9 is connected to a piston rod of the compression cylinder 10, the compression cylinder 10 is arranged on the compression cylinder support 8, and the motors 11 drive the belt pulleys 12 and the conveying belts 13 to rotate so as to drive main shafts of the drillers 6 to rotate. The automobile die casting 14 is positioned by the clamp body 15, and the compression plate 9 clamps the automobile die casting 14 via the compression cylinder 10. The drill bit guide sleeve assembly 16 exerts the effect of preventing the drillers 6 from deviating.

What is claimed is:

1. A multifunctional adjustable drilling machine, comprising supporting leg seats, a frame, a bottom plate, driller supports, driller support index plates, drillers, a compression cylinder bracket, a compression cylinder support, a compression plate, a compression cylinder, motors, belt pulleys, conveying belts, a clamp body and a drill bit guide sleeve assembly, wherein the supporting leg seats are connected with the frame, the frame being connected with the bottom plate, the bottom plate being connected with the driller supports, the bottom plate being provided with holes and positioning pins matched with the driller supports, angles of the driller support index plates being adjustable, the drillers machine holes in an automobile die casting at different angles, and the compression cylinder bracket and the compression cylinder support being connected to the bottom plate; the compression plate being connected to a piston rod of the compression cylinder, the compression cylinder being arranged on the compression cylinder support, the motors driving the belt pulleys and the conveying belts to rotate, the automobile die casting being positioned by the clamp body, and the compression plate clamping the automobile die casting via the compression cylinder; and the drill bit guide sleeve assembly exerting an effect of preventing the drillers from deviating.

\* \* \* \* \*